Patented Apr. 3, 1934

1,953,468

UNITED STATES PATENT OFFICE 1,953,468

POLYMERIZATION OF DIOLEFINES

Georg Ebert, Friedrich August Fries, and Paul Garbsch, Ludwigshafen-on-the-Rhine, Germany, assignors to I. G. Farbenindustrie Aktiengesellschaft, Frankfort - on - the - Main, Germany No Drawing. Application May 27, 1930, Serial No. 456,285. In Germany June 10, 1929

17 Claims. (Cl. 260—6)

This invention relates to improvements in the polymerization of diolefines.

The polymerization of diolefines as for example of butadiene, isoprene, dimethylbutadiene or homologues and analogues thereof or mixtures of these in the presence of metallic polymerizing agents, such as alkali metals or alkaline earth metals or their alloys or mixtures, especially when the diolefines are employed in a substantially undiluted condition frequently proceeds in a very irregular and turbulent manner so that the polymerization of diolefines on a large scale offers considerable difficulty; polymerization products are obtained thereby which are insoluble, or only partly soluble or soluble only with great difficulty and which in consequence of their great shape elasticity frequently give rise to great difficulties in their industrial working up.

We have now found that in the polymerization of diolefines in the presence of metallic polymerizing agents such as alkali metals or alkaline earth metals or alloys or mixtures of the same, a uniform course of the reaction may be ensured by employing additions of organic compounds in which at least 2 valencies of the same carbon atom are saturated by oxygen. Unsaturated organic compounds of the said nature often furnish particularly good results.

Acetals, in particular cyclic acetals or among these those which contain a double linkage between two carbon atoms, have been found to be especially active. Instead of the acetals their components may also be employed. As examples of such acetals may be mentioned dibutyl acetal (a saturated acetal), or as examples of cyclic acetals those obtained by condensation of 1.2- and 1.3-glycols with aldehydes. The employment of unsaturated aldehydes leads to unsaturated acetals. Ethylene acetal, the acetal obtained from crotonaldehyde and butylene glycol or that obtained from acrolein and butylene glycol may be mentioned as examples of cyclic acetals, the two latter also being of unsaturated nature.

Ketones, which may for example be aliphatic, hydroaromatic or aromatic or may contain two different radicals from any of these classes are also very advantageous additions. Good results are for example obtained with acetone, methyl ethyl ketone, cyclohexanone, quinone, acetophenone, benzophenone, or furfurol. The latter compound is preferably employed in very small amounts.

Additions of aldehydes and especially of unsaturated aldehydes also yield very good results, and as specific examples may be mentioned, formaldehyde, acetaldehyde, croton aldehyde, acrolein and in small amounts benzaldehyde or cinnamic aldehyde.

Esters also have a beneficial effect and as examples may be mentioned ortho-esters, for example ortho formic ethyl ester or ortho carbonic ethyl ester, or other esters such as amyl acetate, ethyl acetate, ethyl crotonate or phthalic diethyl ester.

Carboxylic acids such as formic acid or acetic acid may also be employed, but preferably in very small amounts.

As a general rule only small amounts of the said organic compounds are added, for example between about 5 and 0.05 per cent by weight with reference to the amount of the diolefine under treatment. The amount of the additions employed will of course also depend on the amount of the metallic polymerizing agent present since the added organic compound often reacts therewith. An excess of the metallic polymerizing agent should preferably be present, that is to say usually only so much of the said organic compounds is added that sufficient of the free metallic agent is present. Where the compounds resulting from the reaction between the metallic polymerizing agent and the said organic compounds themselves exercise a polymerizing action, an excess of the said metallic agent will be unnecessary. The amounts added are capable of wide variation and larger or smaller amounts of the said additions than those mentioned above may be employed. By suitable selection of the relative proportions it is possible at the same time to influence the degree of polymerization in any desired manner, and thus it is possible to prepare products of suitable plasticity and solubility which are suitable for a great variety of fields of employment. Usually the greater the amount of the said organic compounds added, the softer and the more plastic are the polymerization products obtained, whereas tougher products are obtained if the said organic compounds be added in smaller amounts. The softer products are usually more suitable for the production of hard vulcanization products whereas the harder products are more advantageous for the manufacture of soft vulcanization products. In this manner products of different applicability suitable for example for the production of vulcanization products similar to soft rubber products or for the manufacture of coatings, films, lacquers, artificial silk and the like are obtained.

The process may also be carried out in the simultaneous presence of solvents or in the presence of the cyclic diethers or unsaturated ethers.

The said organic compounds are usually employed in such a condition that they are in a finely dispersed state during the polymerization. Thus they should be either soluble in the reaction mixture, or they are employed in the liquid or gaseous state, or as solutions, either true or colloidal or as emulsions or as a finely divided suspension.

The temperature employed in the polymerization is capable of wide variation. For example, temperatures ranging between room temperature and 90° centigrade may be employed or also higher or lower temperatures.

The following examples will further illustrate the nature of this invention, but the invention is not restricted to these examples. The parts are by weight.

Example 1

1000 parts of butadiene with an addition of 20 parts of dibutyl acetal having the formula

are subjected to polymerization with 3 parts of sodium at 40° centigrade for about 1 to 2 days, for example in a rotating autoclave. The polymerization proceeds quietly and uniformly and yields a product of medium hardness which is well suited for the preparation of products similar to soft rubber.

Example 2

1000 parts of butadiene are polymerized in the presence of 3 parts of sodium with the addition of 10 parts of ethylene acetal having the formula

The reaction proceeds at about 40° centigrade very quietly and smoothly and is completed after about 1 or 2 days. A polymerization product having good plasticity is obtained which may be further worked up in an excellent manner.

Example 3

A mixture of 400 parts of butadiene and 2 parts of the acetal from crotonaldehyde and butylene glycol having the formula

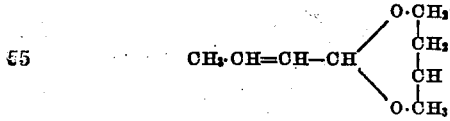

may be polymerized at about 40° centigrade in about 3½ days. The reaction proceeds very quietly and regularly. The polymerization product obtained is very homogenous and plastic and is eminently suitable for working up into products similar to soft rubber.

Example 4

800 parts of butadiene are caused to react with the aid of 4.8 parts of metallic sodium and with the addition of 1.6 parts of the acetal from crotonaldehyde and butylene glycol in a rotating iron boiler. The course of the polymerization is quiet and it is completed in about 1 to 1½ days. A product of great tenacity and good elasticity is formed which may be worked up into vulcanization products of excellent quality similar to soft rubber.

Example 5

250 parts of butadiene are polymerized for 2½ days in a rotary reaction vessel together with 1 part of sodium and 0.5 part of the acetal obtained from acrolein and 1.3 butylene glycol. The reaction proceeds very smoothly and uniformly and a polymerization product is obtained having good plasticity. It furnishes solutions of low viscosity and is well adapted for the production of rayon.

Example 6

1000 parts of butadiene are polymerized together with 1 part of croton aldehyde and 4 parts of sodium in an iron autoclave which is maintained in rolling motion, at a temperature of between about 40° and 50° centigrade. The polymerization is completed in about 3 days and a product is obtained which is well adapted for vulcanization into soft resilient products.

Example 7

1000 parts of butadiene together with 2 parts of acetophenone and 4 parts of sodium are polymerized in a rotary autoclave at a temperature of about 40° C. The reaction proceeds very quietly. In about 1 to 2 days a very plastic product is obtained, which is distinguished by a good tackiness and is very suitable for the production of films and coatings.

Example 8

500 parts of butadiene are polymerized together with 1 part of benzophenone and 0.75 part of an alloy of sodium and potassium containing 66 per cent of the latter. The reaction commences very rapidly and proceeds uniformly and quietly. It is completed in about 18 hours. The product obtained has a high plasticity and can be readily worked up into soft elastic vulcanization products.

Example 9

1 part stearic acid and 5 parts of vinyl ethyl ether are added to 1000 parts of butadiene and the mixture is polymerized with 2 parts of sodium in an iron autoclave. The reaction is completed in about 2 days and a very homogeneous polymerization product is obtained in which the alkali metal is dispersed very uniformly. The product can be readily worked up into soft resilient vulcanisates of high tensile strength on account of its good plasticity.

Example 10

1000 parts of butadiene are polymerized together with 3.3 parts of phthalic diethyl ether and 4 parts of sodium in an autoclave which is in a rolling state of motion. The reaction proceeds very quietly and uniformly and a polymerization product is obtained in which the sodium is dispersed homogeneously throughout the product. It is well adapted for working up on rollers and is very suitable for the production of soft resilient vulcanization products.

Example 11

1000 parts of butadiene are polymerized together with 5 parts of orthoformic ethyl ester and 4 parts of sodium. The reaction proceeds very uniformly and is completed in about 1½ days. A homogeneous polymerization product is obtained in which the sodium is dispersed in a very uniform manner and which is well adapted for the production of soft resilient polymerization products.

Example 12

1000 parts of butadiene are polymerized for about 1½ days with an addition of 2 parts of oleic acid and 4 parts of sodium in an iron rotary autoclave. The reaction proceeds smoothly and uniformly and furnishes a product, which is well adapted for conversion into soft resilient vulcanisates.

What we claim is:—

1. A process for the production of a polymerization product of a diolefine, which comprises polymerizing said diolefine in the presence of a metal selected from the group consisting of the alkali metals and alkaline earth metals and with an unsaturated organic compound in which at least two valencies of the same carbon atom are saturated by oxygen.

2. A process for the production of a polymerization product of a diolefine, which comprises polymerizing said diolefine in the presence of a metal selected from the group consisting of the alkali metals and alkaline earth metals and with an acetal.

3. A process for the production of a polymerization product of a diolefine, which comprises polymerizing said diolefine in the presence of a metal selected from the group consisting of the alkali metals and alkaline earth metals and with a cyclic acetal.

4. A process for the production of a polymerization product of a diolefine, which comprises polymerizing said diolefine in the presence of a metal selected from the group consisting of the alkali metals and alkaline earth metals and with an unsaturated cyclic acetal.

5. A process for the production of a polymerization product of a diolefine, which comprises polymerizing said diolefine in the presence of a metal selected from the group consisting of the alkali metals and alkaline earth metals and with between 5 and 0.05 per cent by weight, with reference to the amount of the diolefine under treatment, of an oxygen compound selected from acetals and unsaturated organic compounds in which at least two valencies of the same carbon atom are saturated by oxygen.

6. A process for the production of a polymerization product of a diolefine, which comprises polymerizing said diolefine in the presence of a metal selected from the group consisting of the alkali metals and alkaline earth metals and with between 5 and 0.05 per cent by weight, with reference to the amount of the diolefine under treatment, of an acetal.

7. A process for the production of a polymerization product of a diolefine, which comprises polymerizing said diolefine with a metal selected from the group consisting of alkali metals and the alkaline earth metals and with between 5 and 0.05 per cent by weight, with reference to the amount of the diolefine under treatment, of an oxygen compound selected from acetals and unsaturated organic compounds in which at least two valencies of the same carbon atom are saturated by oxygen.

8. A process for the production of a polymerization product of a diolefine, which comprises polymerizing said diolefine in the presence of a metal selected from the group consisting of the alkali metals and the alkaline earth metals and with an aldehyde.

9. A process for the production of a polymerization product of a diolefine, which comprises polymerizing said diolefine with a metal selected from the group consisting of the alkali metals and the alkaline earth metals and with an unsaturated aldehyde.

10. A process for the production of uniform polymerization products of diolefines which comprises polymerizing the same at a temperature ranging from room temperature to 90° C. in the presence of a catalyst selected from the class consisting of alkali metals and alkaline earth metals, and an acetal for rendering the course of the reaction smooth and uniform.

11. A process for the production of uniform polymerization products of diolefines which comprises polymerizing the same at a temperature ranging from room temperature to 90° C. in the presence of a catalyst selected from the class consisting of alkali metals and alkaline earth metals, and a cyclic acetal for rendering the course of the reaction smooth and uniform.

12. A process for the production of uniform polymerization products of diolefines which comprises polymerizing the same at a temperature ranging from room temperature to 90° C. in the presence of a catalyst selected from the class consisting of alkali metals and alkaline earth metals, and a cyclic acetal containing a double linkage between two carbon atoms for rendering the course of the reaction smooth and uniform.

13. A process for the production of a polymerization product of a diolefine, which comprises polymerizing said diolefine in the presence of a metal selected from the group consisting of the alkali metals and alkaline earth metals, and in the presence of an oxygen compound selected from acetals and unsaturated organic compounds in which at least two valencies of the same carbon atom are saturated by oxygen.

14. A process for the production of a polymerization product of a diolefine, which comprises polymerizing said diolefine in the presence of an alkali metal and of an oxygen compound selected from acetals and unsaturated organic compounds in which at least two valencies of the same carbon atom are saturated by oxygen.

15. A process for the production of a polymerization product of a diolefine, which comprises polymerizing said diolefine in the presence of sodium and of an oxygen compound selected from acetals and unsaturated organic compounds in which at least two valencies of the same carbon atom are saturated by oxygen.

16. A process for the production of a polymerization product of a diolefine, which comprises polymerizing said diolefine in the presence of a metal selected from the group consisting of the alkali metals and alkaline earth metals, and in the presence of an oxygen compound selected from acetals and unsaturated organic compounds in which at least two valencies of the same carbon atom are saturated by oxygen, at temperatures ranging between about room temperature and 90° C.

17. A process for the production of a polymerization product of butadiene, which comprises polymerizing butadiene in the presence of a metal selected from the group consisting of the alkali metals and alkaline earth metals, and in the presence of an oxygen compound selected from acetals and unsaturated organic compounds in which at least two valencies of the same carbon atom are saturated by oxygen.

GEORG EBERT.
FRIEDRICH AUGUST FRIES.
PAUL GARBSCH.